US007577514B2

(12) United States Patent
Nakaoka

(10) Patent No.: US 7,577,514 B2
(45) Date of Patent: Aug. 18, 2009

(54) RUNNING TIME ESTIMATION APPARATUS, RUNNING DATA RELAY APPARATUS, AND RUNNING TIME ESTIMATION SYSTEM

(75) Inventor: Ken Nakaoka, Ichinomiya (JP)

(73) Assignee: Sanyo Electric Co., Ltd., Osaka (JP)

( * ) Notice: Subject to any disclaimer, the term of this patent is extended or adjusted under 35 U.S.C. 154(b) by 496 days.

(21) Appl. No.: 11/392,631

(22) Filed: Mar. 30, 2006

(65) Prior Publication Data

US 2006/0220906 A1 Oct. 5, 2006

(30) Foreign Application Priority Data

Mar. 30, 2005 (JP) .......................... P2005-097391

(51) Int. Cl.
*G08G 1/133* (2006.01)
*G01C 21/00* (2006.01)

(52) U.S. Cl. ........................ 701/119; 701/207; 340/992

(58) Field of Classification Search ....................... None
See application file for complete search history.

(56) References Cited

U.S. PATENT DOCUMENTS 5,919,239 A * 7/1999 Fraker et al. .................. 701/35
6,282,486 B1 * 8/2001 Bates et al. ................. 701/117
6,426,709 B1 * 7/2002 Becker et al. ............... 340/992
6,711,493 B1 * 3/2004 Andrews et al. ............ 701/117
7,046,168 B2 * 5/2006 Tsuboi ....................... 340/903
7,110,880 B2 * 9/2006 Breed et al. ................. 701/207
7,236,878 B2 * 6/2007 Watanabe ................... 701/200
2004/0236499 A1 * 11/2004 Watanabe ................... 701/200
2005/0107945 A1 * 5/2005 Hiller et al. ................. 701/201

FOREIGN PATENT DOCUMENTS

JP 9-62997 * 3/1997
JP 2004-206351 7/2004

* cited by examiner

*Primary Examiner*—Michael J. Zanelli
(74) *Attorney, Agent, or Firm*—McDermott Will & Emery LLP

(57) ABSTRACT

A running time estimation system according to the present invention is provided with a receiver for receiving running data including a plurality of time and position data having a predetermined time and a vehicle position of different vehicles at the predetermined time by use of a wireless communication system, a running data processor for generating running time estimation data in which the received running data is associated with road information from which a position and a length of a road can be determined, and a running time estimation unit for calculating a running time between designated positions by using the generated running time estimation data.

9 Claims, 14 Drawing Sheets

RUNNING TIME ESTIMATION APPARATUS, RUNNING DATA RELAY APPARATUS, AND RUNNING TIME ESTIMATION SYSTEM

CROSS REFERENCE TO RELATED APPLICATIONS

This application is based upon and claims the benefit of priority from the prior Japanese Patent Applications No. P2005-097391 filed on Mar. 30, 2005; the entire contents of which are incorporated herein by reference.

BACKGROUND OF THE INVENTION

1. Field of the Invention

The present invention relates to a running time estimation apparatus, a running data relay apparatus, and a running time estimation system that are installed in a vehicle and used for estimating a running time between designated positions.

2. Description of the Related Art

Conventionally, a vehicle information and communication system (VICS) that provides a vehicle with vehicle information such as traffic congestion and traffic controls has been widely known.

The VICS includes an FM multiplex system that provides vehicle information mainly wide range information by utilizing FM multiplex broadcasting, and a beacon system that provides route condition in a running direction of a vehicle from a beacon transmitter installed on a road.

Thus, there is a problem in that providing vehicle information through the VICS is limited to a specific region where related equipment is installed. In response to this, a method is disclosed where traffic congestion information indicating whether or not the traffic congestion is present, is provided between vehicles running nearby (see, for example, Japanese Laid-open Patent Application No. 2004-206351, pages 9 to 11, FIGS. 3 and 4).

Specifically, whether the traffic congestion is present between specific positions is determined based on an average running speed of a vehicle, or the like. The traffic congestion information transmitted from the vehicle is transmitted to other vehicle nearby with the use of a wireless communication system (for example, optical communications).

Further, based on the received traffic congestion information, the vehicle that received the traffic congestion information displays whether or not the traffic congestion exists between the specific positions on a car navigation device, and relays the traffic congestion information to other vehicles nearby with the use of the wireless communication system.

In this manner, traffic congestion information is sequentially relayed (that is, multihop) between vehicles nearby so that the traffic congestion information in a position around a vehicle can be provided.

BRIEF SUMMARY OF THE INVENTION

However, the above described method of providing traffic congestion information between vehicles includes the following disadvantage. That is, there is a problem in that a running time between designated positions associated with traffic congestion cannot be precisely estimated since only information indicating whether or not traffic congestion exists is provided to a vehicle from other vehicles nearby.

Accordingly, the present invention has been made in view of the forgoing. Therefore, it is an object of the present invention to provide a running time estimation apparatus capable of further precisely estimating a running time between desired positions, a running data relay apparatus, and a running time estimation system, in the case where status information of traffic congestion is transmitted/received between vehicles by using a wireless communication system.

To solve the above described problem, the present invention has the following aspects. A first aspect of the present invention is summarized by a running time estimation apparatus that is installed in a vehicle to estimate a running time between designated positions, including: a running data receiver configured to receive running data including a plurality of time and position data having a predetermined time and a vehicle position of different vehicles at the predetermined time by use of a wireless communication system; a running time estimation data generator configured to generate running time estimation data in which the running data received by the running data receiver is associated with road information from which a position and length of a road can be determined; and a running time calculator configured to calculate a running time between the designated positions by using the running time estimation data generated by the running time estimation data generator.

According to this aspect, the running data including a plurality of the time and position data having a predetermined time and the vehicle position of the different vehicle(s) at the predetermined time is transmitted/received between the vehicles.

Therefore, it is possible that a vehicle that received running data precisely estimates a running time between specific positions, involving traffic congestion. That is, according to this aspect of the present invention, a running time between desired positions can be precisely estimated in the case where a status of traffic congestion is transmitted/received by using a wireless communication system.

A second aspect of the present invention according to the first aspect of the present invention is summarized in that the running data further includes a running speed history indicating changes of a running speed of the different vehicles between a first predetermined time and a second predetermined time which is later than the first predetermined time.

A third aspect of the present invention according to the first or the second aspect of the present invention is summarized in that the running data further includes identification information for identifying the different vehicle.

A fourth aspect of the present invention according to the first to the third aspects is summarized in that the running time estimation data generator overwrites an existing running data with new running data when, in the road information, the new running data including the vehicle position which is overlapping with the vehicle position of the existing running data that has been already associated with the road information is newly received.

A fifth aspect of the present invention according to the first to the fourth aspects is summarized in that the running time calculator estimates a running time between the designated positions by using a determined time corresponding to the designated position which is determined based on a plurality of the time and position data included in the running time estimation data when the designated position does not match the vehicle position included in the running time estimation data.

A sixth aspect of the present invention according to the first to the fifth aspects is summarized in that the running time calculator estimates a running time of a gap section which is a section of the road having no association with the running data in the running time estimation data by using the running data placed before and after the gap section when the gap section is included between the designated positions.

A seventh aspect of the present invention according to the second to the fifth aspects is summarized in that the running time calculator estimates a running time of a gap section which is a section of the road having no association with the running data in the running time estimation data by using the running speed history included in the running data placed before and after the gap section when the gap section is included between the designated positions.

An eighth aspect of the present invention according to the first to the seventh aspects is summarized in that a running data relay unit is further included to relay the running data received by the running data receiver to a different vehicle by use of the wireless communication system.

A ninth aspect of the present invention according to the eighth aspect of the present invention is summarized in that the running data relay unit determines whether or not the running data is relayed based on a latest position of the different vehicle included in the running data received by the running data receiver and a distance between the different vehicle and the vehicle which is calculated from a position of the vehicle at the time of receiving the running data.

A tenth aspect of the present invention is summarized by a running data relay apparatus installed in a vehicle, including a running data generator configured to generate running data including a plurality of time and position data having the predetermined time and a vehicle position of the vehicle at the predetermined time, and a running data transmitter configured to transmit the running data generated by the running data generator by use of a wireless communication system.

An eleventh aspect of the present invention according to the tenth aspect of the present invention is summarized in that the running data generator generates new running data when the vehicle has run a predetermined distance since the running data was transmitted, and the running data transmitter transmits the new running data as soon as the new running data is generated by the running data generator.

A twelfth aspect of the present invention according to the tenth aspect of the present invention is summarized in that the running data generator generates new running data when a predetermined time has passed since the running data was transmitted, and the running data transmitter transmits the new running data as soon as the new running data is generated by the running data generator.

A thirteenth aspect of the present invention according to the tenth to the twelfth aspects of the present invention is summarized in that a running data receiver to receive running data transmitted by a different vehicle and a running data relay unit to relay the running data received by the running data receiver to a further different vehicle are further included.

A fourteenth aspect of the present invention according to the thirteenth aspect of the present invention is summarized in that the running data relay unit determines whether or not the running data is relayed based on a latest position of the different vehicle included in the running data received by the running data receiver and a distance between the different vehicle and the vehicle which is calculated from a position of the vehicle at the time of receiving the running data.

A fifteenth aspect of the present invention is summarized by a running time estimation system including a running data relay apparatus, and a running time estimation apparatus for estimating a running time between designated positions, which are installed in a vehicle. The running data relay apparatus includes: a running data generator configured to generate running data including a plurality of time and position data having a predetermined time and a vehicle position of the vehicle at the predetermined time; and a running data transmitter configured to transmit the running data generated by the running data generator by use of a wireless communication system. The running time estimation apparatus includes: a running data receiver configured to receive the running data by use of the wireless communication system; a running time estimation data generator configured to generate running time estimation data in which the running data received by the running data receiver is associated with road information from which a position and length of a road can be determined; and a running time calculator configured to calculate a running time between the designated positions by using the running time estimation data generated by the running time estimation data generator.

According to the aspects of the present invention, it is possible to provide a running time estimation apparatus capable of further precisely estimating a running time between desired positions, a running data relay apparatus, and a running time estimation system, in the case where a status of traffic congestion is transmitted/received between vehicles by use of a wireless communication system.

DESCRIPTION OF THE PREFERRED EMBODIMENTS

Figure 1:
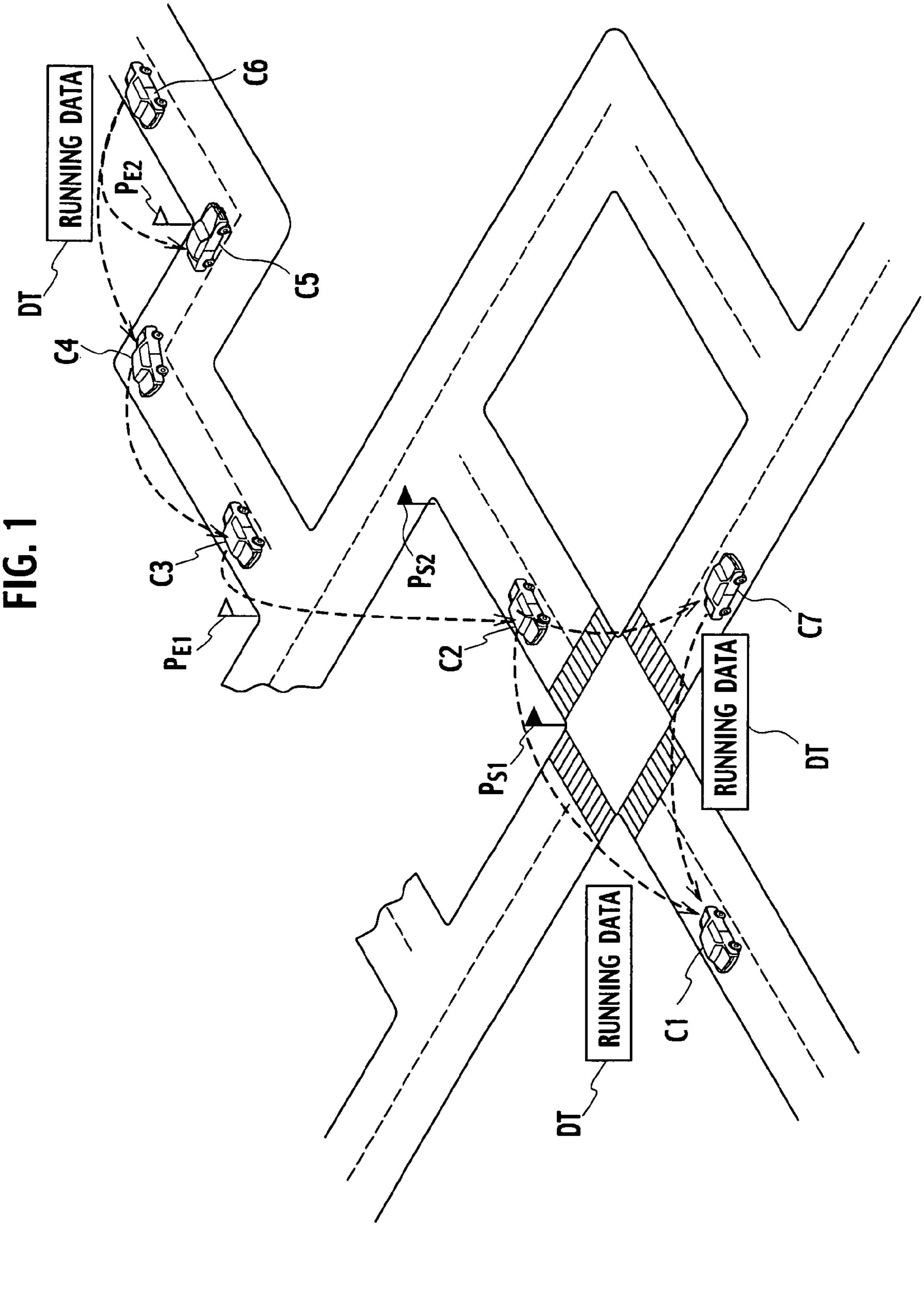
FIG. 1 is a schematic diagram for briefly describing a running time estimation system according to one embodiment of the present invention.

Preferred embodiments of the present invention will now be given below. It should be noted that, in the following drawings, the same or similar portions are given of the same or similar reference numerals, but the drawings are only typical examples and have different ratio of a size, or the like from actual ones.

Therefore, a specific size, or the like should be determined by considering the following descriptions. In addition, it of course includes a portion that the relation of each other's sizes and the ratio also vary between drawings.

(Outline of Running Time Estimation System)

FIG. 1 is a schematic diagram for briefly describing a running time estimation system according to an embodiment of the present invention. A running time estimation system 100 (not shown in FIG. 1, but see FIG. 2) is installed in vehicles C1 to C7 to estimate a running time between designated positions (for example, from a starting position $P_{S1}$ to an end position $P_{E1}$).

The vehicles C1 to C7 in which the running time estimation systems are installed can transmit/receive running data DT (see, FIG. 7) including a plurality of time and position data which includes time information and vehicle position information with the use of a wireless communication system.

In the present embodiment, the vehicles C1 to C7 in which the running time estimation system is installed transmit/receive the running data DT with the use of a wireless LAN system which conforms to IEEE 802.11.

The vehicles C1 to C7 in which the running time estimation system is installed can further relay (that is, multihop) the running data DT received from one vehicle, to another vehicle. For example, the vehicle C2 can relay the running data received from the vehicle C3, to the vehicle C1.

In this manner, since the running data DT is sequentially relayed, the vehicles C1 to C7 can receive the running data DT transmitted from another vehicle running nearby.

It should be noted that the wireless communication system used in the running time estimation system 100 is not limited to the wireless LAN system which conforms to IEEE 802.11, but UWB (ultra wide band) or Bluetooth can be used, for example.

In addition, in the present embodiment, an ad-hoc mode which does not require a wireless base station is used, but a wireless base station can be installed in the vicinity of a road to relay running data DT with the wireless base station interposed therebetween.

(Logical Block Configuration of Running Time Estimation System)

Figure 2:
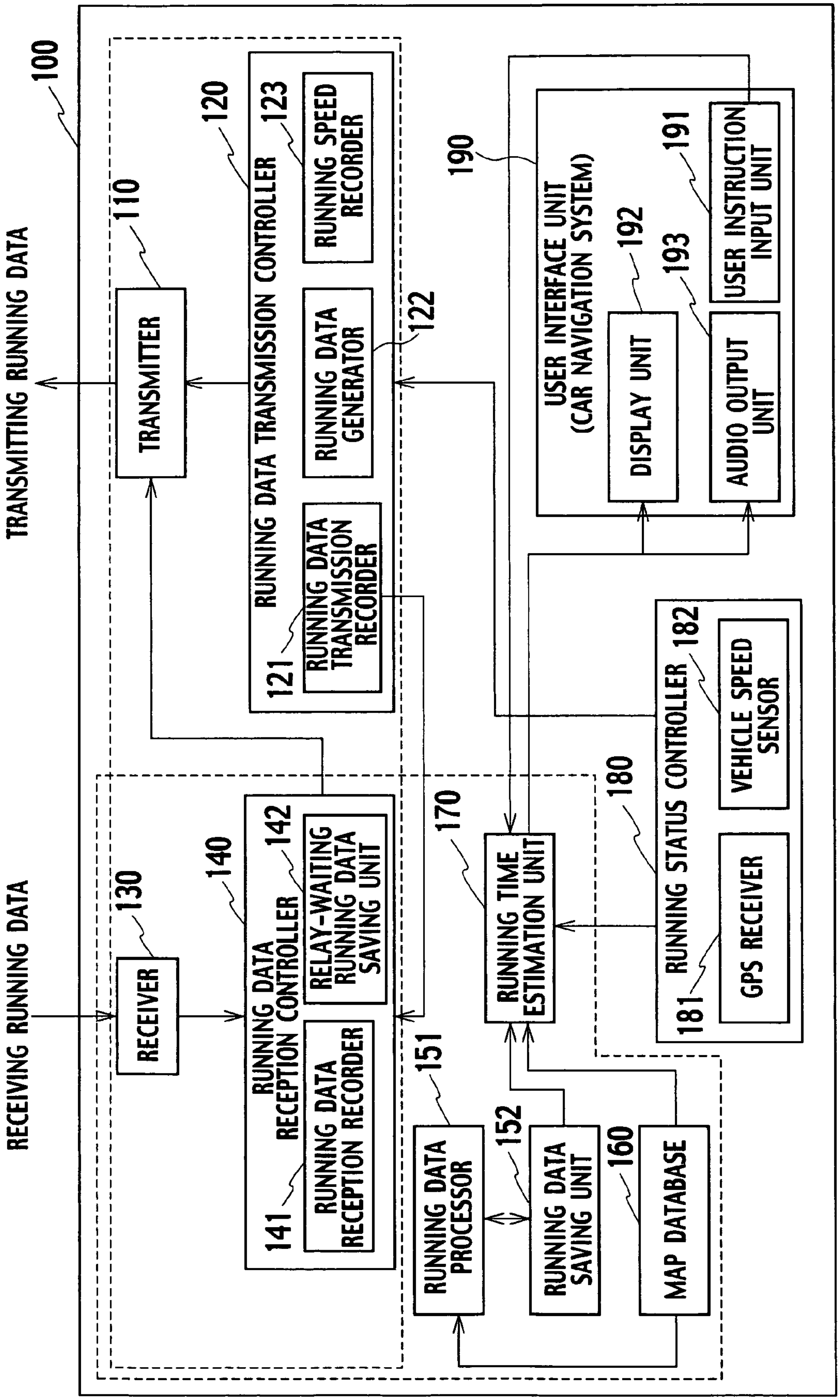
FIG. 2 is a diagram showing a logical block configuration of the running time estimation system according to one embodiment of the present invention.

FIG. 2 is a diagram showing a logical block configuration of the running time estimation system 100 installed in the vehicle C1 shown in FIG. 1. It should be noted that the running time estimation system 100 is also installed in each of the vehicles C2 to C7.

As shown in FIG. 2, with regard to transmission/reception of running data DT, the running time estimation system 100 is provided with a transmitter 110, a running data transmission controller 120, a receiver 130, and a running data reception controller 140.

In addition, with regard to processing of the running data DT, the running time estimation system 100 is provided with a running data processor 151, a running data saving unit 152, and a map database 160.

The running time estimation system 100 is further provided with a running time estimation unit 170 for calculating and estimating a running time between designated positions.

In addition, the running time estimation system 100 is provided with a running status controller 180 and a user interface unit 190.

It should be noted that it is possible to configure a running time estimation apparatus which carries out only calculation and estimation of a running time by receiving running data DT, with the above described receiver 130, the running data reception controller 140, the running data processor 151, the running data saving unit 152, the map database 160, and the running time estimation unit 170 (a range represented by a dotted frame in FIG. 2). It is also possible to configure a running data relay apparatus for carrying out only generation, transmission, and relay of the running data DT with the above described transmitter 110, the running data transmission controller 120, the receiver 130, and running data reception controller 140 (a range represented by a dotted frame in FIG. 2).

The transmitter 110 transmits running data DT generated by the running data transmission controller 120 (specifically, a running data generator 122) with the use of the wireless LAN system (a wireless communication system). In the present embodiment, the transmitter 110 serves as a running data transmitter.

Specifically, the transmitter 110 transmits running data DT to another vehicle as soon as the running data DT is newly generated (new running data) by the running data transmission controller 120 (the running data generator 122).

The running data transmission controller 120 includes a running data transmission recorder 121, a running data generator 122, and a running speed recorder 123.

When the running data DT generated by the running data generator 122 is transmitted to the transmitter 110, the running data transmission recorder 121 records a time (current time) that is, the time when the running data DT is transmitted toward other vehicle, a vehicle position and an identification number of the transmitted running data DT.

The running data generator 122 generates running data DT including a plurality of time and position data which include a vehicle position at a predetermined time and the predetermined time.

Figure 7:
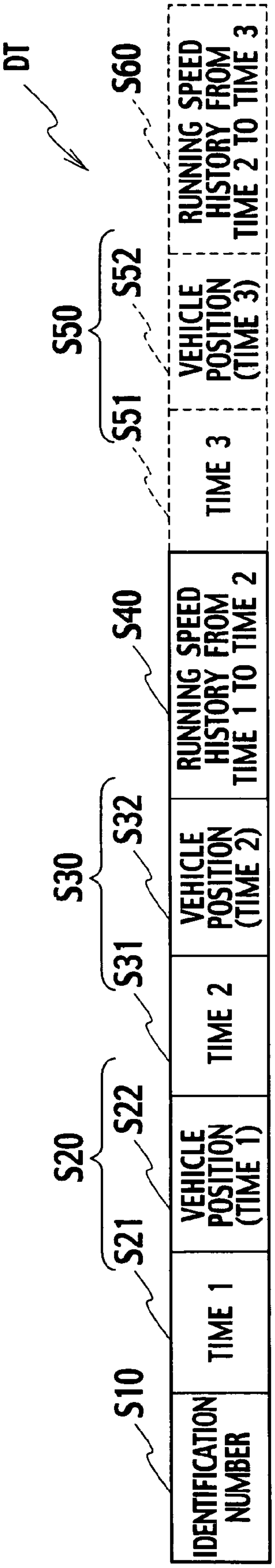
FIG. 7 is a diagram showing a configuration of running data according to one embodiment of the present invention.

The configuration of running data DT will be described referring to FIG. 7. As shown in FIG. 7, the running data DT includes an identification number S10, time and position data S20, time and position data S30, and running speed history information S40.

The identification number S10 is identification information for identifying the vehicle C1. Specifically, the identification number S10 includes a unique number that can uniquely specify the vehicle C1 and a serial number that is assigned to each running data DT. It should be noted that the identification number S10 is not necessarily included in running data DT.

The time and position data S20 includes time information S21 and vehicle position information S22. Similarly, the time and position data S30 includes time information S31 and vehicle position information S32.

Specifically, the time information S21 (time 1) stores transmission time of the last running data DT, and the time information S31 (time 2) stores transmission time of a running data DT at this time.

The vehicle position information S22 stores information (longitudinal and latitudinal information) showing a vehicle position at the time 1, and the vehicle position information S32 stores information (longitudinal and latitudinal information) showing a vehicle position at the time 2.

It should be noted that the information showing a vehicle position may be coordinate information showing a relation between distance and a direction from a specific reference point instead of the latitudinal and longitudinal information.

Figure 10A:
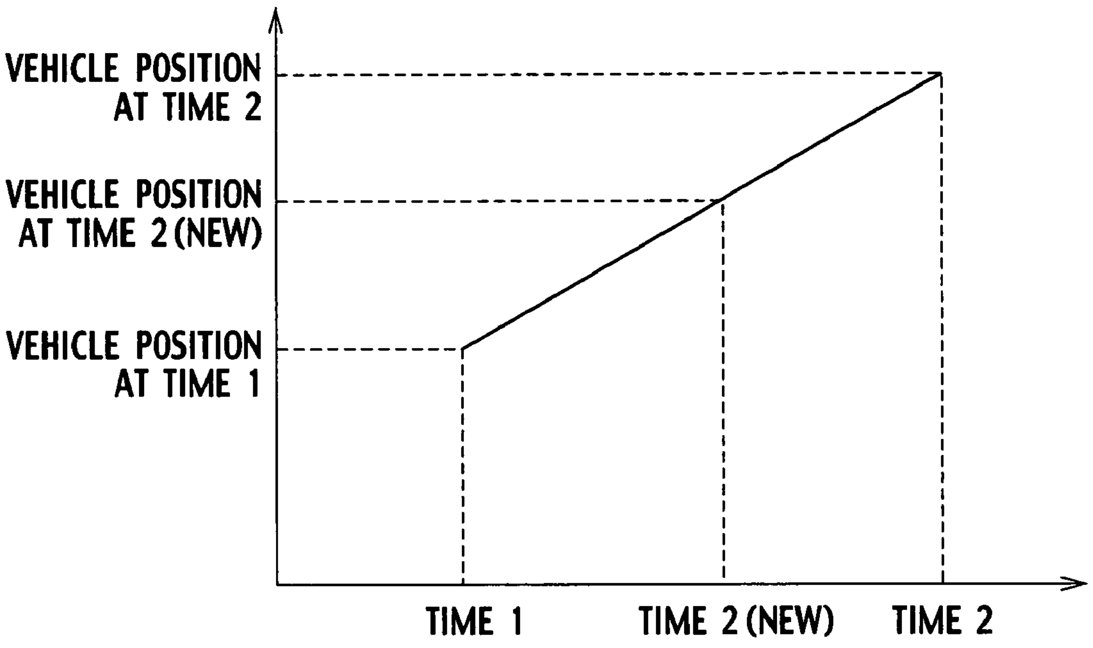
FIGS. 10A and 10B are graphs for describing overwriting processing of running data.
Figure 10B:
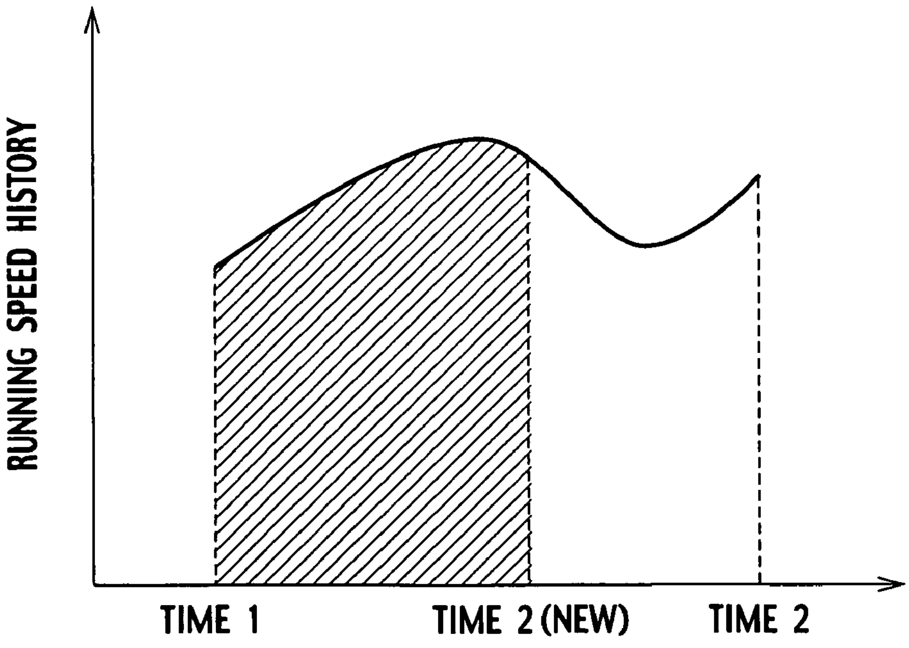

The running speed history information S40 stores information (for example, information as shown in FIG. 10B) in which a running speed of the vehicle C1 from time 1 to time 2 is seriated in time sequence.

In addition, the running data DT may include time and position data S50 including time information S51 and vehicle position information S52, and speed history information S60 that is information in which a running speed of the vehicle C1 from time 2 to time 3 is seriated in time sequence.

When the time and position data S50 and the speed history information S60 are included, the time information S51 (time 3) stores the transmission time of the running data DT at this time.

In this case, the time information S31 (time 2) is a time from time 1 to time 3. When running data DT including the time and position data from time 1 to time 2 and from time 2 to time 3 is collectively transmitted at time 3, not at time 2, the running data DT includes the time and position data S30 as the information at time 2 and the running speed history information S40 as the information from time 1 to time 2.

Further, the running data DT does not necessarily include the running speed history information S40 and the speed history information S60. In addition, since a size of running data DT becomes larger when the running data DT includes the running speed history information S40 (and S60), it is possible that the running speed history information S40 (and S60) might not be included only when the quality of wireless communication is deteriorated.

The running data generator 122 which generates running data DT shown in FIG. 7, can generate new running data DT (new running data) when the vehicle C1 has run "a predetermined distance" since the last running data DT was transmitted.

The running data generator 122 can also generate new running data DT (new running data) when "a predetermined time" has passed since the last running data DT was transmitted.

The running speed recorder 123 shown in FIG. 2 records running speeds of the vehicle C1 at every predetermined time so as to generate the running speed history information S40 (and S60) included in the running data DT. The running speed recorder 123 deletes the recorded running speed information when the running data DT is transmitted by the running data generator 122.

The receiver 130 receives the running data DT which are transmitted from another vehicle (one of the vehicles C2 to C7) with the use of a wireless LAN system. In the present embodiment, the receiver 130 serves as a running data receiver.

The running data reception controller 140 includes a running data reception recorder 141 and a relay-waiting running data saving unit 142.

The running data reception recorder 141 records an identification number S10 (see, FIG. 7) which is included in the running data DT received by the receiver 130.

The relay-waiting running data saving unit 142 saves the running data DT received from another vehicle by the receiver 130 so as to further relay the running data DT received from vehicle (one of vehicles the C2 to C7) to another vehicle.

Figure 8:
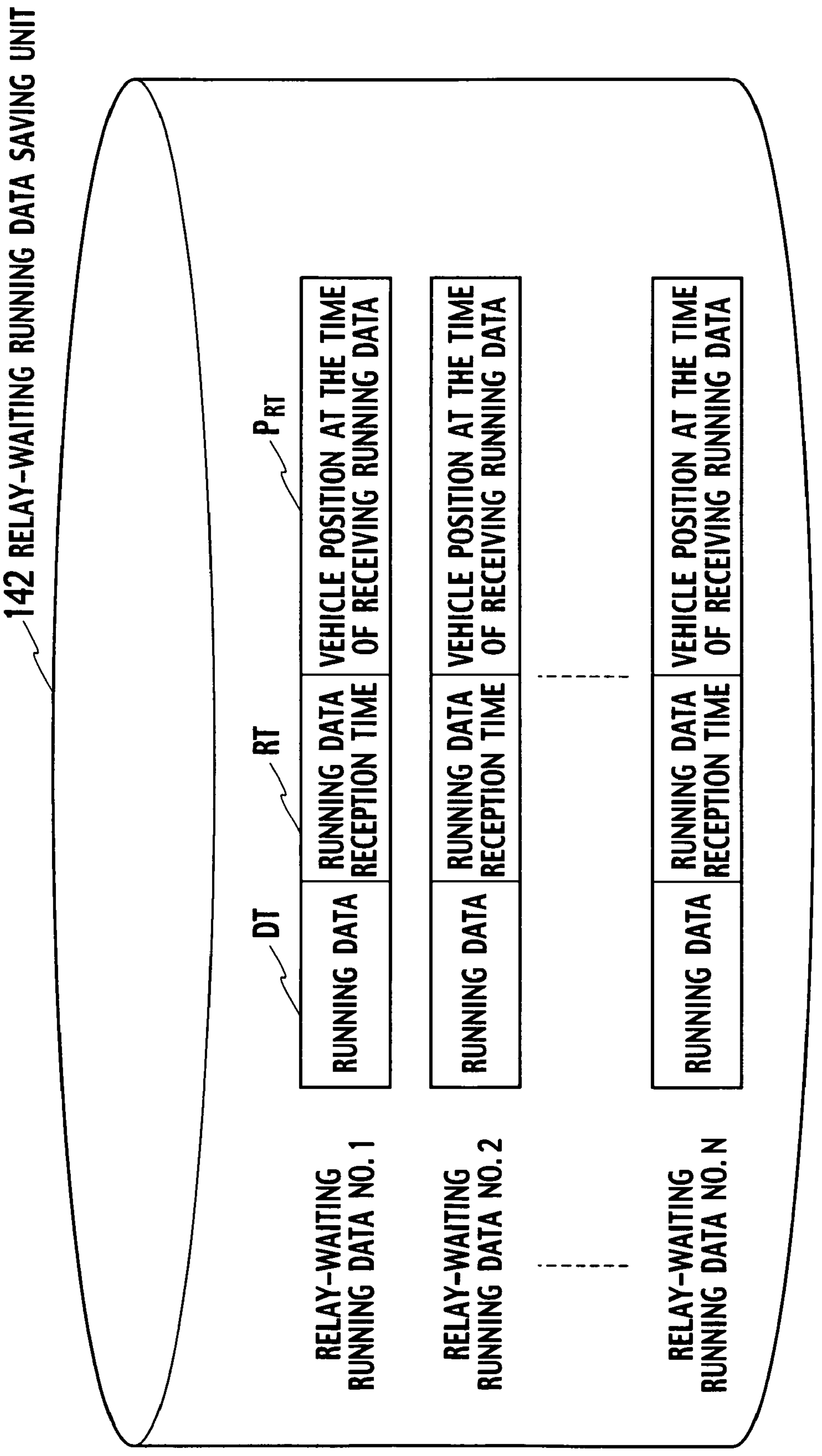
FIG. 8 is a diagram showing a configuration of relay-waiting running data stored in the running time estimation system according to one embodiment of the present invention.

Specifically, as shown in FIG. 8, the relay-waiting running data saving unit 142 saves relay-waiting running data including the running data DT received from another vehicle by the receiver 130, a running data reception time RT which is a time of receiving the running data DT, and a vehicle position PRT of the vehicle C1 at the time of receiving the running data DT.

In the present embodiment, a running data relaying unit is configured by including the above described transmitter 110 and the running data reception controller 140, for further relaying the running data DT received from one vehicle by the receiver 130 to another vehicle, with the use of the wireless LAN system.

In addition, the transmitter 110 and the running data reception controller 140 can determine whether or not the running data DT is relayed, based on the latest vehicle position (for example, the vehicle position data S32 shown in FIG. 7) of another vehicle (for example, the vehicle C2), which is included in the running data DT received by the receiver 130, and a distance between the vehicles C1 and C2 which is calculated from the latest vehicle position PRT of the vehicle C1 at the time of receiving the running data DT.

Further, the running data reception controller 140 can discard running data DT without relaying, when the running data DT having an identification number S10 (see, FIG. 7) included in the running data DT received by the receiver 130, has been already saved in the relay-waiting running data saving unit 142.

The running data processor 151 generates running time estimation data $DT_E$ from the running data DT which is transmitted by the running data reception controller 140, and saves the generated running time estimation data $DT_E$ into the running data saving unit 152.

Specifically, the running data processor 151 generates the running time estimation data $DT_E$ in which the running data DT received by the receiver 130 is associated with road information from which a position and distance of a road can be determined. In the present embodiment, the running data processor 151 serves as a running time estimation data generator.

Figures 9A, 9B, 9C:
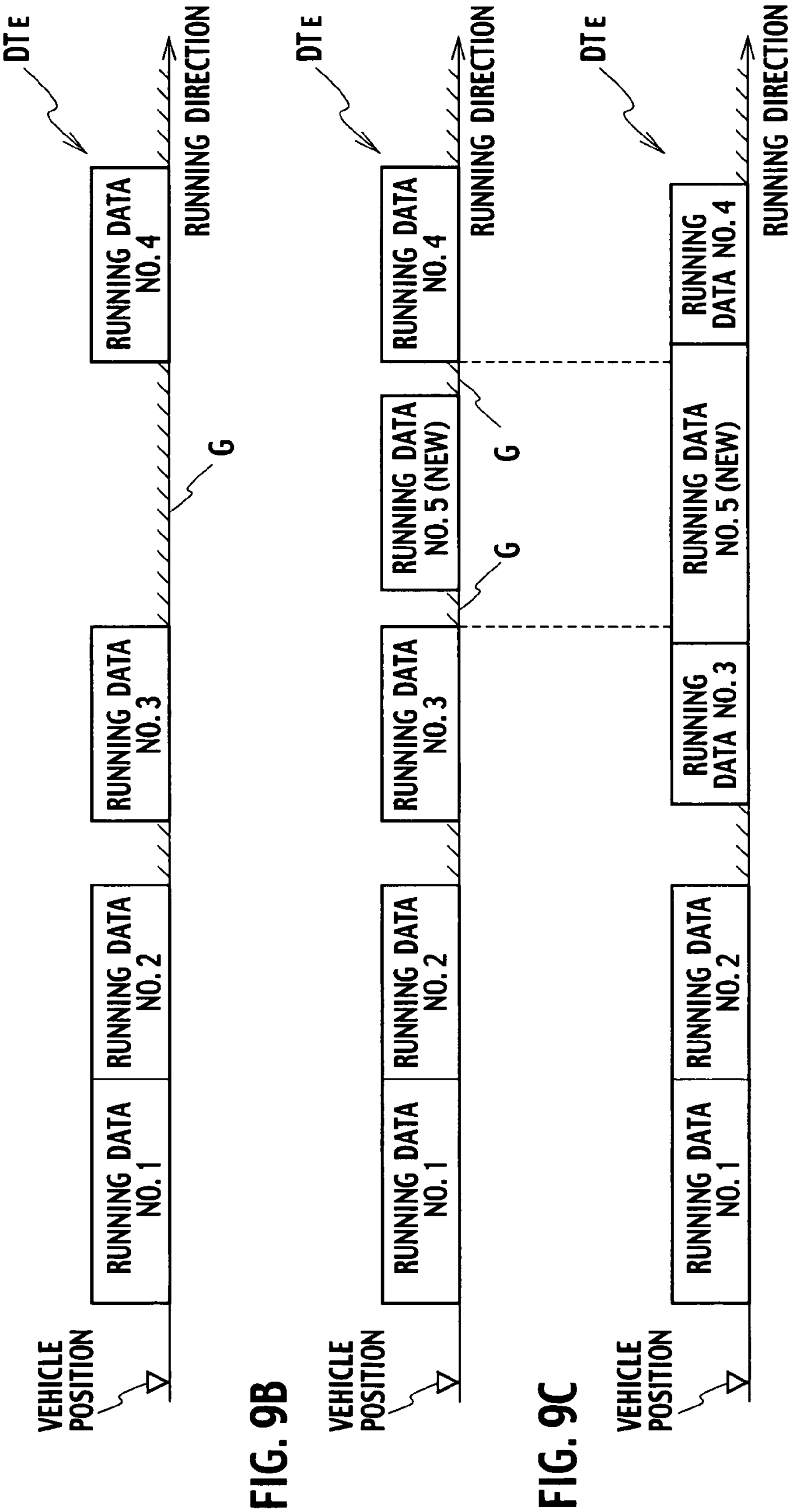
FIGS. 9A to 9C are diagrams showing configurations of running time estimation data according to one embodiment of the present invention.

Referring now to FIG. 9A, a method of generating running time estimation data $DT_E$ by the running data processor 151, will be described. As shown in FIG. 9A, the running data processor 151 associates the received running data (running data No. 1 to No. 4) with the road information (horizontal axis in FIG. 9A) from which the position and distance of the road can be determined, and saves it as the running time estimation data $DT_E$ into the running data saving unit 152.

Specifically, the running data processor 151 associates the running data No. 1 to No. 4 with the road information, based on the vehicle position information (for example, the vehicle position information S22 shown in FIG. 7) included in the running data No. 1 to No. 4.

It should be noted that although the road information is shown as linear information in FIG. 9A for the sake of simplicity, it is possible to use a map database from which a position and distance (route) of each road can be determined, as road information.

In addition, the running data processor 151 overwrites the running data DT that has been already associated with the road information with newly received running data DT, when running data DT (new running data) overlapping with the running data that has been already associated with the road information (the existing running data) with regard to the vehicle position, is newly received.

Specifically, as shown in FIG. 9C, when a running data No. 5 overlapping with the running data No. 3 and No. 4 with regard to the vehicle position is received anew, the running data processor 151 overwrites the running data No. 3 and No. 4 with the running data No. 5. It should be noted that detailed descriptions of the processing of overwriting running data DT by the running processing unit 151 will be given later.

It should be noted that it is also determined by the running data processor 151 from contents of the received running data DT, that the received running data DT is not an appropriate running data in a running direction of the vehicle C1, and the determined running data DT is not included in the running time estimation data $DT_E$.

The map database 160 saves a map database (road information) to be used in the running data processor 151 and the running time estimation unit 170.

The running time estimation unit 170 calculates a running time between positions designated from the user interface unit 190 (car navigation system).

Specifically, the running time estimation unit 170 calculates a running time between the designated positions (for example, from the starting position $P_{S1}$ to the end position $P_{E1}$ shown in FIG. 1) by using running time estimation data $DT_E$ saved in the running data saving unit 152. In the present embodiment, the running time estimation unit 170 serves as a running time calculator.

In addition, when the designated position does not match with the vehicle position included in the running time estimation data $DT_E$ (specifically, running data DT), the running time estimation unit 170 determines a time which corresponds to the position, based on a plurality of the time and position data included in the running time estimation data $DT_E$, and estimates a running time between the positions by using the determined time corresponding to the position.

Figure 11:
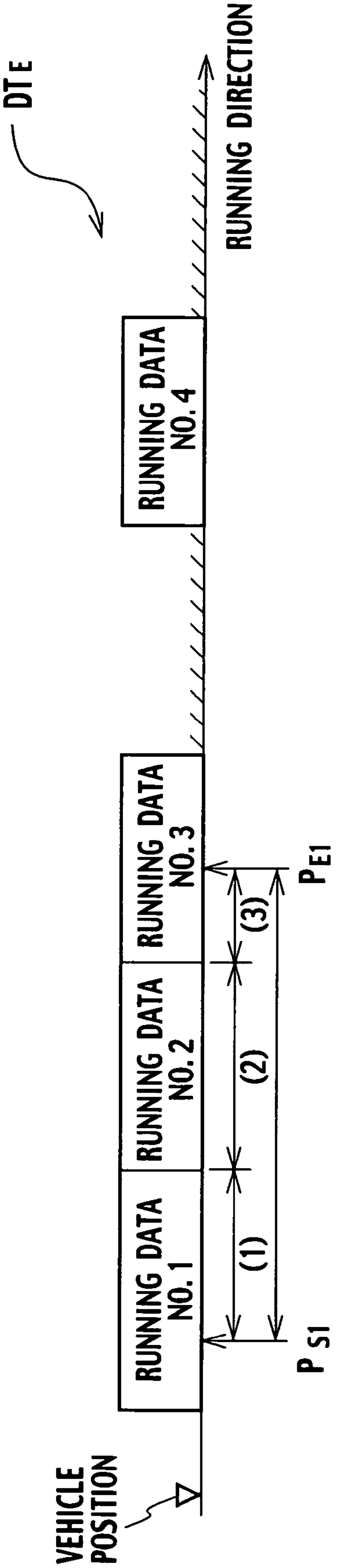
FIG. 11 is a diagram for describing a method of estimating a running time with the use of the data for estimating a running time.

A method of estimating a running time by the running time estimation unit 170 will now be described below. As shown in FIG. 11, the running time estimation unit 170 calculates a running time from the staring position $P_{S1}$ to the end position $P_{E1}$ designated from the user interface unit 190 (car navigation system).

Figure 12A:
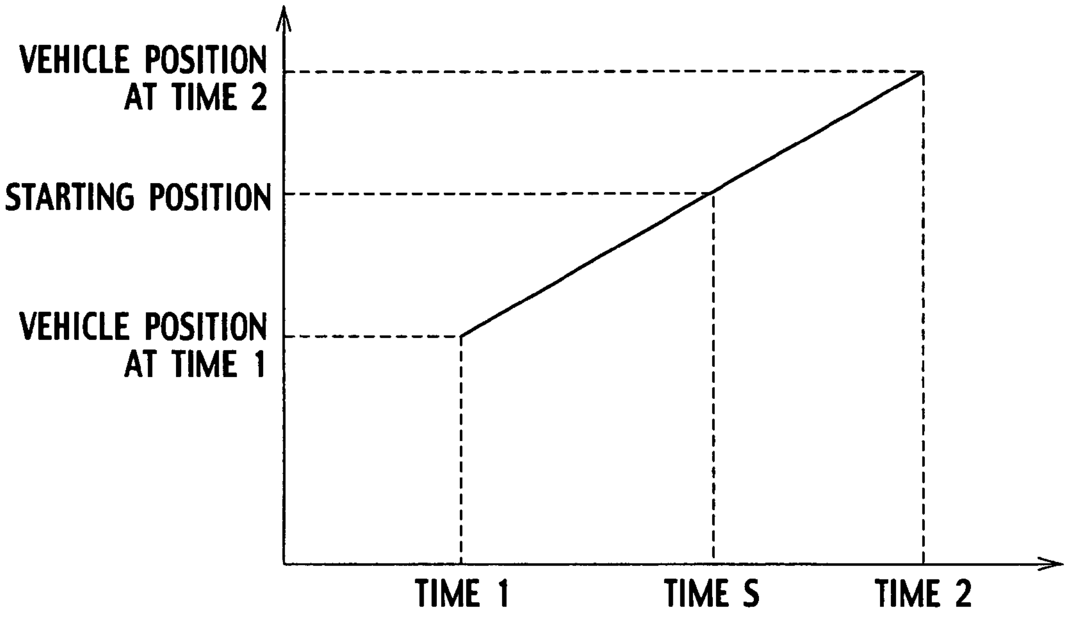
FIGS. 12A and 12B are graphs for describing methods of estimating a running time by using the running time estimation data.

Specifically, as shown in FIG. 12A, the running time estimation unit 170 determines time S (a time corresponding to a position) corresponding to the starting position (the starting position $P_{S1}$) by extending the value linearly from the time and position data S20 regarding time 1 and the time and position data S30 regarding time 2 which are included in the running data No. 1 (see, FIG. 7).

Figure 13A:
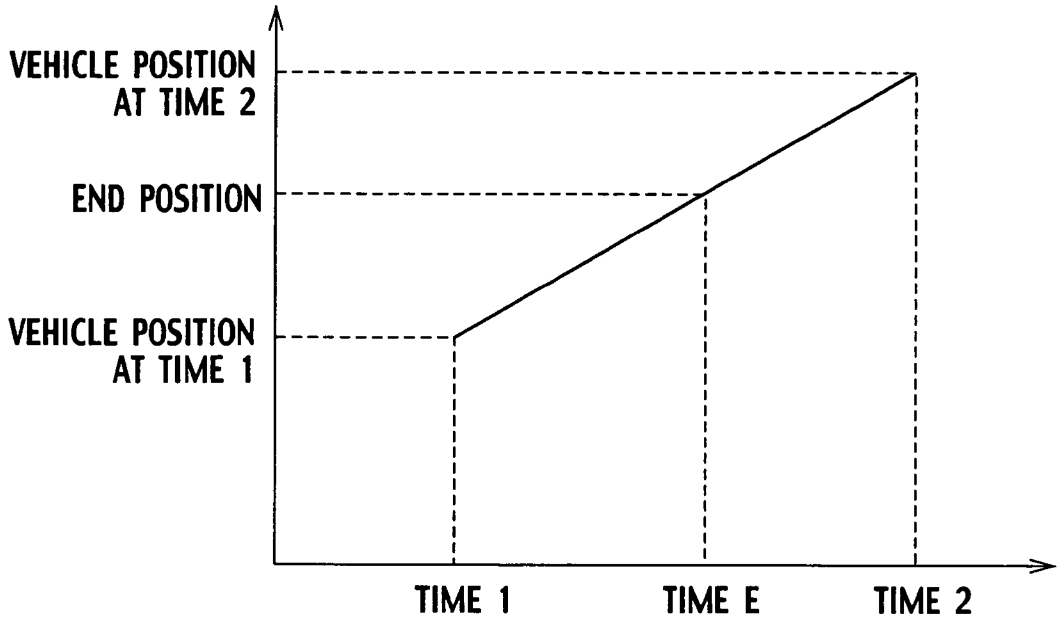
FIGS. 13A and 13B are graphs for describing methods of estimating a running time by using the running time estimation data.

In addition, as shown in FIG. 13A, the running time estimation unit 170 determines time E (a time corresponding to a position) corresponding to the end position (the end position $P_{E1}$) by extending the value linearly from the time and position data S20 regarding time 1 and the time and position data S 30 regarding time 2 which are included in the running data No. 3 (see, FIG. 7).

The running time estimation unit 170 can estimate the total time of (1), (2), and (3) shown in FIG. 11, that is, a running time from the starting position $P_{S1}$ to the end position $P_{E1}$.

Figure 12B:
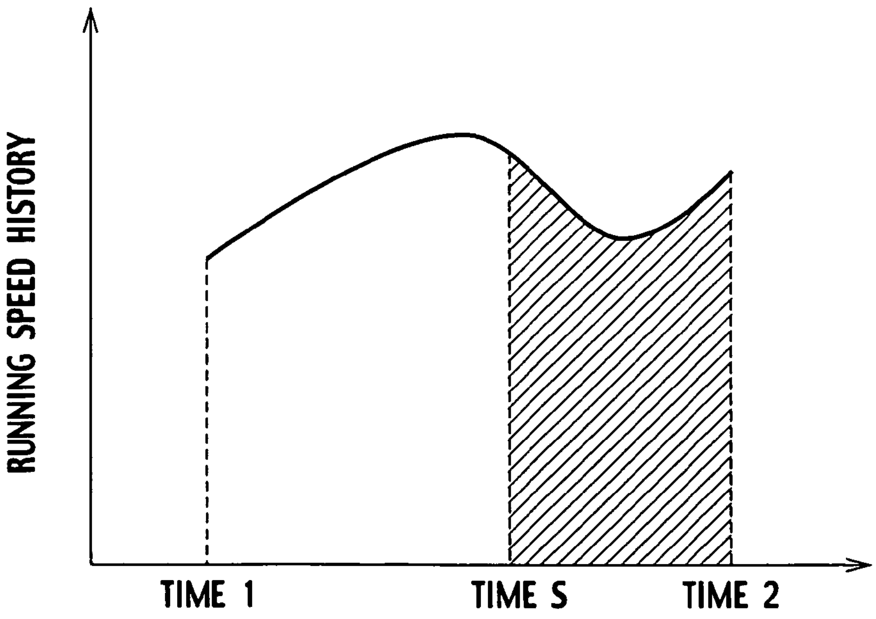
Figure 13B:
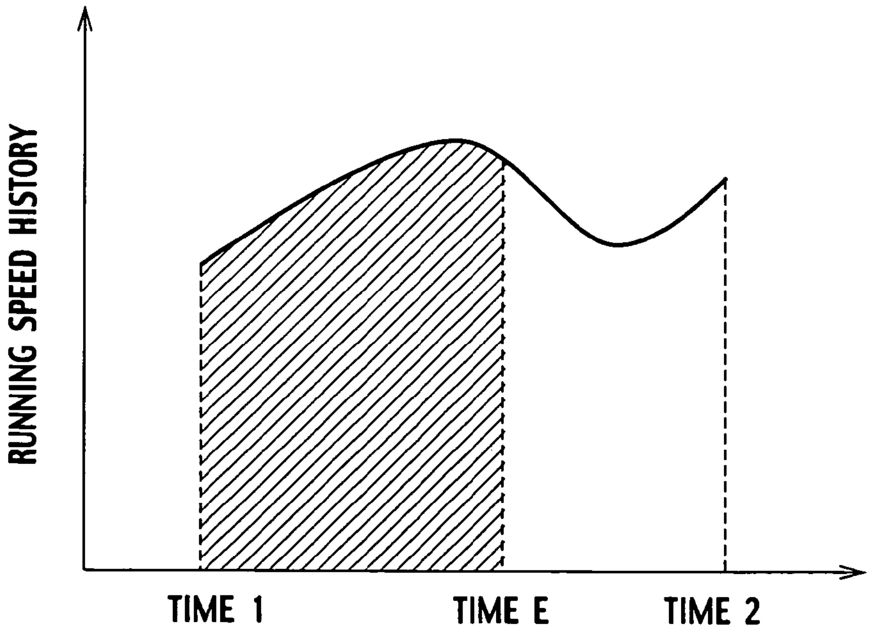

It should be noted that when the running data No. 1 and No. 3 include a running speed history (the running speed history information S40 shown in FIG. 7), as shown in FIGS. 12B and 13B, the running time estimation unit 170 can also determine time S corresponding to the starting position $P_{S1}$ and time E corresponding to the end position $P_{E1}$ by use of the running speed history, besides linearly extending the value shown in FIGS. 12A and 13A.

Specifically, by using a predetermined time interval and plurality of running speeds calculated from the running speed history, the running time estimation unit 170 calculates a time when a distance from the starting position $P_{S1}$ to the vehicle position (the vehicle position included in the vehicle position information S32 shown in FIG. 7) at time 2 included in the running data No. 1, equals to an area shown with shaded area in FIG. 12B. The running time estimation unit 170 provides the time obtained by the calculation as time S which corresponds to the starting position $P_{S1}$. As shown in FIG. 13B, the running time estimation unit 170 determines time E by a similar method.

In addition, the running time estimation unit 170 estimates, in the running time estimation data $DT_E$, a running time in a gap section by using the running data DT positioned before and after the gap section. Specifically, when the gap section which is a section of a road and with which the running data DT is not associated is included between the positions designated from the user interface unit 190, the running time estimation unit 170 estimates the running time in the gap section.

Figure 14:
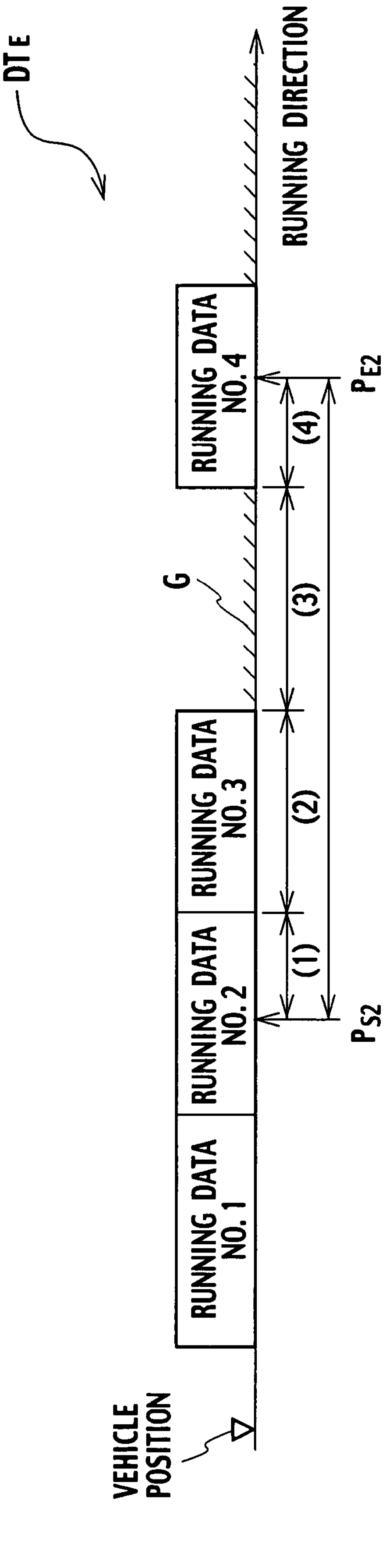
FIG. 14 is a diagram for describing a method of estimating a running time by using the running time estimation data.

More specifically, as shown in FIG. 14, in the running time estimation data $DT_E$, when a gap section G with which the running data DT is not associated is included between the designated positions (from the starting position $P_{S2}$ to the end position $P_{E2}$), the running time estimation unit 170 estimates a running time ($T_{GAP}$) of the gap section G by the formula (1).

$$T_{GAP}=D_{GAP}\times\{(T_3+T_4)/(D_3+D_4)\} \quad (1)$$

Here, $D_{GAP}$ indicates a distance that the gap section G occupies, $D_3$ indicates a distance that the running data No. 3 occupies, and $D_4$ indicates a distance that the running data No. 4 occupies.

It should be noted that as described above, in the running time estimation data $DT_E$, the running data DT (the running data No. 1 to No. 4) is associated with the road information from which determining the position and distance of the road can be determined. Therefore, a distance that the running data occupies can be obtained from the vehicle position information S22 and the vehicle position information S32 (see, FIG. 7) which are included in the running data DT.

In the formula (1), $T_3$ indicates a running time of the running data No. 3 and $T_4$ indicates a running time of the running data No. 4. It should be noted that $T_3$ and $T_4$ can be obtained by calculating a difference between the time information S21 and the time information S31 which are included in the running data DT.

In addition, in the running time estimation data $DT_E$, when a gap section which is a section of a road and with which the running data DT is not associated is included between the positions designated from the user interface unit 190, the running time estimation unit 170 can estimate a running time in the gap section by using the running speed history included in the running data DT positioned before and after the gap section.

Specifically, as shown in FIG. 14, in the running time estimation data $DT_E$, when the gap section with which the running data DT is not associated is included between the designated positions (from the starting position $P_{S2}$ to the end position $P_{E2}$), the running time estimation unit 170 estimates a running time in the gap section G based on the running speed history of the running data No. 3 and No. 4.

Figure 15:
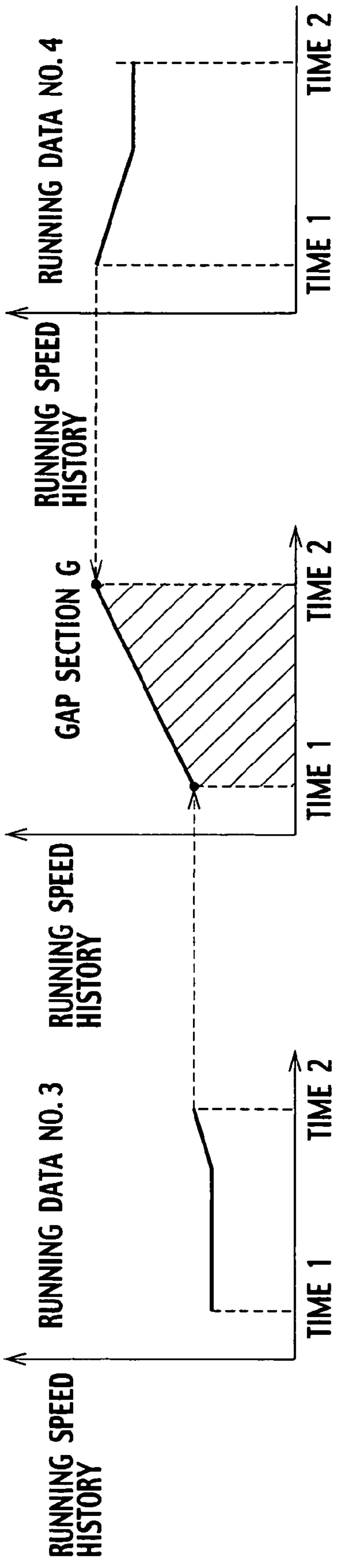
FIG. 15 is a diagram for describing a method of estimating a running time by using the running time estimation data.

More specifically, as shown in FIG. 15, the running time estimation unit 170 estimates a running speed history of the gap section G based on the running speed of the running data No. 3 at time 2, and the running seed of the running data No. 4 at time 1.

The running time estimation unit 170 provides the running speed of the running data No. 3 at time 2 as the running speed of the gap section G at time 1, and provides the running speed of the running data No. 4 at time 1 as the running speed of the gap section G at time 2. Further, the running time estimation unit 170 provides a line connecting these two running speeds as a running speed history of the gap section G.

The running time estimation unit 170 estimates a running time in the gap section G based on the running speed history of the gap section G.

Specifically, the running time estimation unit 170 calculates time 1 and time 2 when a distance $D_{GAP}$ that the gap section occupies equals to an area shown with shaded area in FIG. 15, and the time obtained by "time 2−time 1" is a running time in the gap section G.

The running status controller 180 includes a GPS receiver 181 and a vehicle speed sensor 182. The running status controller 180 outputs latitudinal and longitudinal information showing the vehicle position of the vehicle C1 received by the GPS receiver 181, and information showing the running speed of the vehicle C1 measured by the vehicle speed sensor 182, to the running data transmission controller 120 and running time estimating unit 170.

The user interface unit 190 includes a user instruction input unit 191, a display unit 192, and an audio output unit 193. It should be noted that, in the present embodiment, a car navigation system installed on the vehicle C1 serves as the user interface unit 190.

A user of the running time estimation system 100, that is, a driver, or the like of the vehicle C1 inputs an instruction into the user instruction input unit 191. Specifically, the user instruction input unit 191 includes a remote controlled signal receiver of the car navigation system, an audio recognizing device, or a touch panel obtained by using the display unit 192, or the like.

In particular, in the present embodiment, the user instruction input unit 191 is used to input information for specifying at least two positions (for example, the starting position $P_{S1}$ and the end position $P_{E1}$ shown in FIG. 1) of which a running time is estimated.

The display unit 192 displays a running time which is calculated and estimated by the running time estimation unit 170 together with a map.

The audio output unit 193 outputs, as audio information, the information regarding the running time and a guidance of a running route to the end position, calculated and estimated by the running time estimation unit 170.

(Operations of Running Time Estimation System)

Next, operations of the above described running time estimation system 100 will be described below. Specifically, each of the operations of (1) running data transmission, (2) running data reception, (3) running data relay, and (4) running time estimation will be described.

(1) Running Data Transmission

Figure 3:
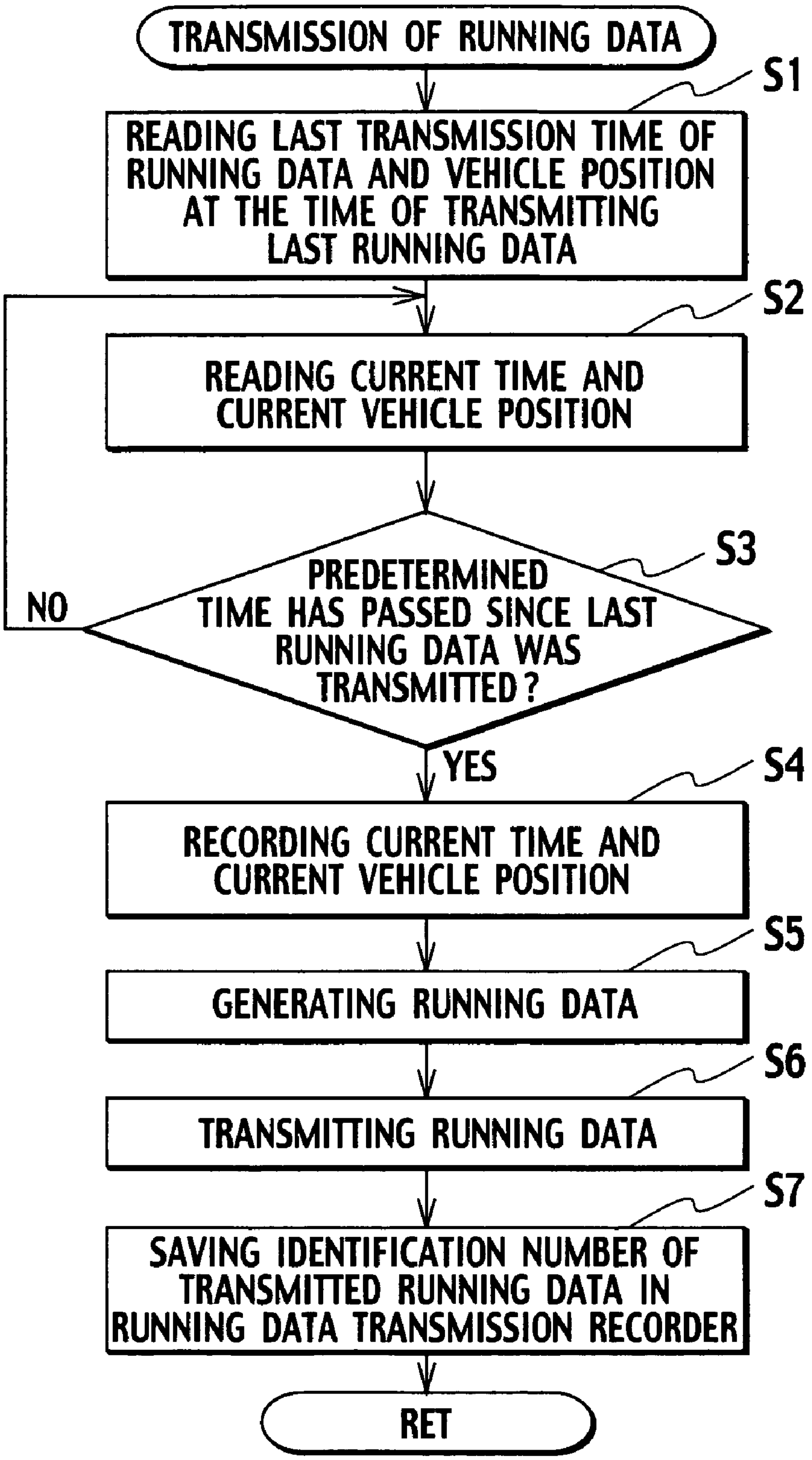
FIG. 3 is a flowchart showing an operation flow of the running time estimation system according to one embodiment of the present invention.

FIG. 3 is a flowchart of transmission process of running data in the vehicle C2. As shown in FIG. 3, in Step S1, the running time estimation system 100 reads the transmission time of the last running data DT and the vehicle position of the vehicle C2 at the time of transmitting the last running data DT, from the running data transmission recorder 121.

In Step S2, the running time estimation system 100 reads the current time and current vehicle position of the vehicle C2 from the running status controller 180.

In Step S3, the running time estimation system 100 determines whether or not a predetermined time interval has passed since the last running data DT was transmitted. It should be noted that the predetermined time interval may be an arbitrary time (for example, 30 seconds) as long as it is not particularly long. In addition, the predetermined time interval may be changed in accordance with a running speed of the vehicle C2.

When a predetermined time interval has passed since the last running data DT was transmitted (YES in Step 53), in Step S4, the running time estimation system 100 records the current time and current vehicle position of the vehicle C2 in the running data transmission recorder 121.

In Step S5, the running time estimation system 100 generates the running data DT as shown in FIG. 7.

Specifically, as shown in FIG. 7, the transmission time of the last running data DT and the vehicle position of the vehicle C2 at the time of transmitting the last running data DT, which are read in Step S1, are stored in the time information S21 and the vehicle position information S22. The current time and current vehicle position of the vehicle C2, which are recorded in Step S4, are stored in the time information S31 and the vehicle position information S32.

In addition, a unique number that can uniquely specify the vehicle C2 and a serial number that is given to each running data DT are stored in the identification number S10.

Further, the running data DT may store a running speed history of the vehicle C2 from the transmission time of the last running data DT to the current time recorded in Step S4, into the running speed history information S40.

In Step S6, the running time estimation system 100 transmits the generated running data DT to another vehicle with the use of the wireless LAN system.

In Step S7, the running time estimation system 100 saves the identification number S10 of the running data DT which is transmitted in Step S6, into the running data transmission recorder 121.

(2) Running Data Reception

Figure 4:
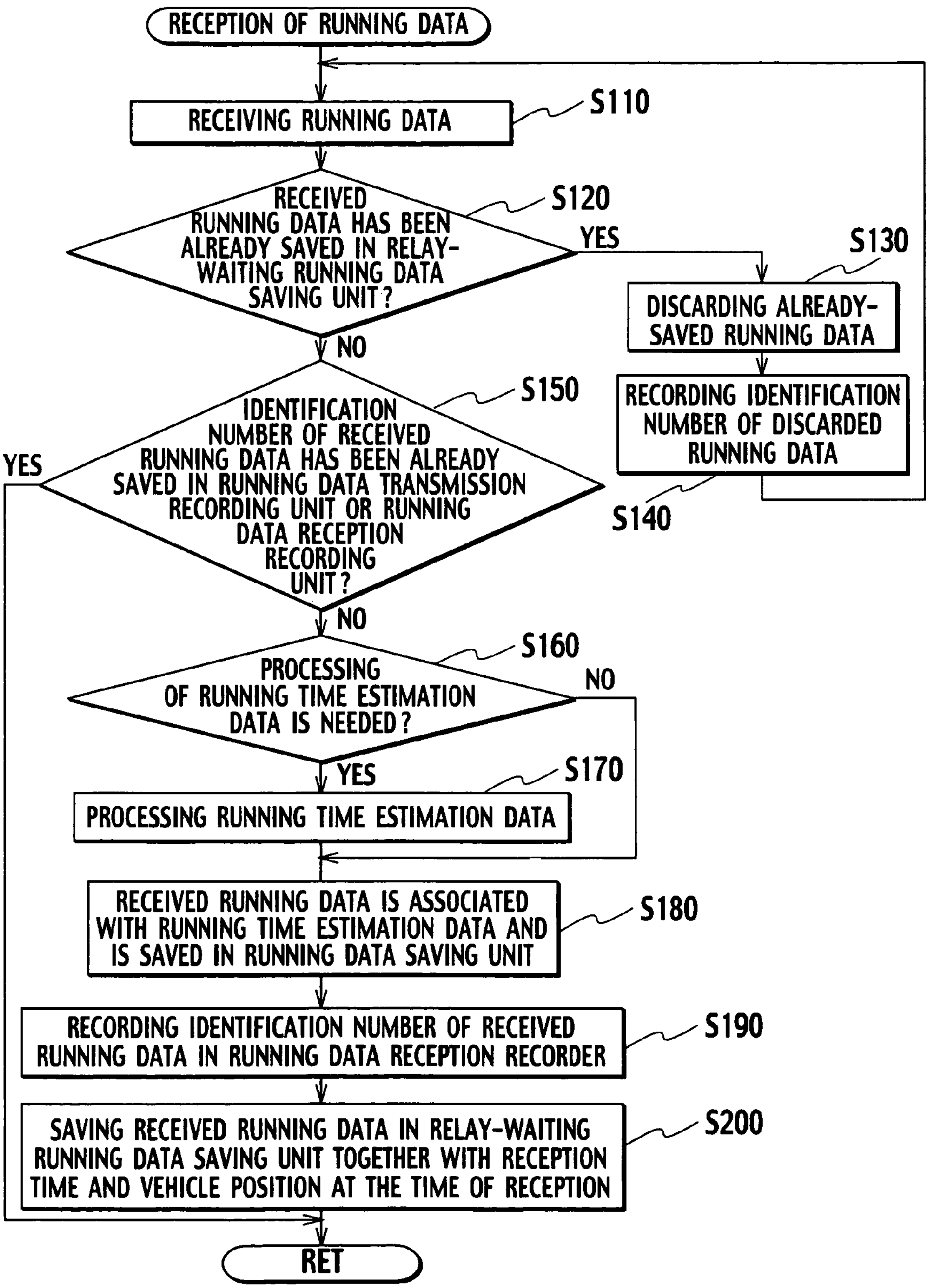
FIG. 4 is a flowchart showing an operation flow of the running time estimation system according to one embodiment of the present invention.

FIG. 4 is a flowchart of transmission process of running data in the vehicle C1. As shown in FIG. 4, in Step S110, the running time estimation system 100 receives the running data DT which is transmitted from the vehicle C2.

In Step S120, the running time estimation system 100 determines whether or not the running data DT received in Step S110 has been already saved in the relay-waiting running data saving unit 142.

Specifically, the running time estimation system 100 refers to the identification number S10 of the running data DT (see, FIG. 7) to determine whether or not the received running data DT has been already saved in the relay-waiting running data saving unit 142.

When the received running data DT has been already saved in the relay-waiting running data saving unit 142 (YES in Step S120), in Step S130, the running time estimation system 100 discards the running data DT that has been already saved in the relay-waiting running data saving unit 142.

In other words, when the running data DT which has been already saved in the relay-waiting running data saving unit 142 is received again, a vehicle other than the vehicle C1 (for example, the vehicle C7 shown in FIG. 7) has relayed the running data DT which is transmitted from the vehicle C2.

In Step S140, the running time estimation system 100 records the identification number S10 of the discarded running data DT in the running data reception recorder 141.

On the other hand, when the received running data DT is not saved in the relay-waiting running data saving unit 142 (NO in Step S120), in Step S150, the running time estimation system 100 determines whether or not the identification number S10 of the received running data DT has been already saved in the running data transmission recorder 121 or the running data reception recorder 141.

When the identification number S10 of the received running data DT has been already saved in the running data transmission recorder 121 or the running data reception recorder 141 (YES in Step S150), the running time estimation system 100 completes the reception processing of the running data.

When the identification number S10 of the received running data DT has not been already saved in the running data transmission recorder 121 or the running data reception recorder 141 (NO in Step S150), in Step S160, the running time estimation system 100 determines whether or not the process of the running time estimation data $DT_E$ which has already generated is needed.

Specifically, as shown in FIG. 9B, when a sufficient gap section G is present between the running data No. 3 and No. 4 which have been already associated with the road information (horizontal axis in FIG. 9B) in the running time estimation data $DT_E$, and newly received running data No. 5 does not overlap with the running data No. 3 and No. 4, the running time estimation system 100 determines that the process of the running time estimation data $DT_E$ is not needed.

On the other hand, as shown in FIG. 9C, when the newly received running data No. 5 overlaps with the running data No. 3 and No. 4, the running time estimation system 100 determines that the processing of the running time estimation data $DT_E$ is needed.

When the process of the running time estimation data $DT_E$ is not needed (NO in Step S160), in Step S180, the running time estimation system 100 associates the received running data DT with unprocessed running time estimation data $DT_E$ and saves the received running data DT in the running data saving unit 152.

When the processing of the running time estimation data DTE is needed (YES in Step S160), in Step S170, the running time estimation system 100 carries out the process of the running time estimation data $DT_E$.

In Step S180, the running time estimation system 100 associates the received running data DT with the running time estimation data $DT_E$ which is already processed to save it in the running data saving unit 152.

Specifically, since the running data No. 3 and No. 4 is overwritten by the running data No. 5 in the running time estimation data $DT_E$, the running time estimation system 100 changes the contents of the time and position data S30 included in the running data No. 3, and the time and position data S20 included in the running data No. 2 (see, FIG. 7).

Referring now to FIG. 10A, a method of changing the time and position data S30 included in the running data No. 3, will be described.

Since the running data No. 5 overwrites the running data No. 3, the vehicle position of the running data No. 3 at time 2 (the vehicle position at time 2 in FIG. 10A) is changed to the vehicle position of the running data No. 5 at time 1 (the vehicle position at time 2 (new) in FIG. 10A).

As shown in FIG. 10A, time 2 (new) corresponding to the changed vehicle position at time 2 (new) is determined by the running time estimation system 100 while linearly extending the value of the changed vehicle position at time 2 (new).

In this manner, the time information S31 is changed from at the time of time 2 to time 2 (new) in the time and position data S30 which is included in the running data No. 3. In addition, the vehicle position at time 2 is changed to the vehicle position at time 2 (new) from the vehicle position at time 2, in the vehicle position information S32. In addition, the time and position data S20 included in the running data No. 4 is similarly changed by the above described method.

It should be noted that when the running speed history (the running speed history information S40 shown in FIG. 7) is included in the running data No. 3 to No. 5, as shown in FIG. 10B, time 2 (new) can also be determined by the running time estimation system 100 by using the running speed history, but not the linear complementation shown in FIG. 10A.

For example, in the case of the running data No. 3, the running time estimation system 100 uses a plurality of running speeds and a predetermined time interval which are calculated from the running speed history, to calculate time at which a distance from the vehicle position at time 1 to the vehicle position at time 2 (new). That is, from the vehicle position at time 1 to the vehicle position of the running data No. 5 at time 1 equals to an area shown with a shaded area in FIG. 10B, and the calculated time comes to be time 2 (new).

The running time estimation system 100 repeats the above calculation so that the time reaching the distance of the vehicle position at time 2 (new) is set to be time 2 (new).

In Step S180, the running time estimation system 100 records the identification number S10 of the running data DT received in Step S110 in the running data reception recorder 141.

In Step S190, the running time estimation system 100 saves the running data DT received in Step S110 in the relay-waiting running data saving unit 142, together with the reception time of the running data DT and the vehicle position of the vehicle C1 at the time of receiving the running data DT (see, FIG. 8).

(3) Running Data Relay

Figure 5:
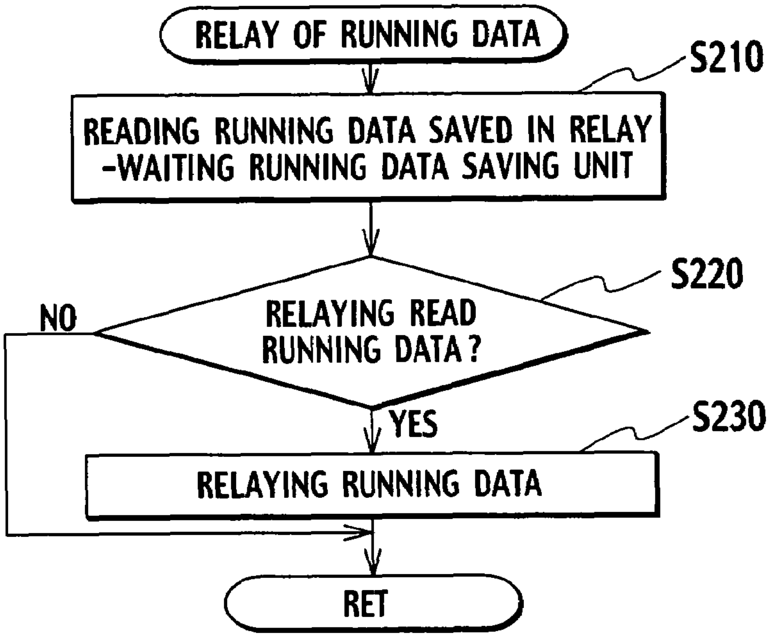
FIG. 5 is a flowchart showing an operation flow of the running time estimation system according to one embodiment of the present invention.

FIG. 5 is a flowchart of the relay process of the running data by the vehicle C1. As shown in FIG. 5, in Step S210, the running time estimation system 100 reads the running data DT saved in the relay-waiting running data saving unit 142.

In Step S220, the running time estimation system 100 determines whether or not the running data DT read from the relay-waiting running data saving unit 142 is relayed to other vehicle.

Specifically, the running time estimation system 100 determines whether or not the running data DT is relayed to another vehicle based on the "running data relay determination formula" shown in formula (2).

$$\text{ELAPSED TIME FROM RUNNING DATA RECEPTION} > \frac{\text{CONSTANT} \times \text{MAXIMUM CAN BE COMMUNICATED}}{\text{DISTANCE TO SOURCE VEHICLE TRANSMITTING RUNNING DATA}} \quad (2)$$

The distance between the vehicle C1 and the source (or relay) vehicle transmitting the running data DT can be calculated from a vehicle position of the source (relay) vehicle which has transmitted the running data DT, that is, the vehicle position information S32 at time 2 included in the running data DT (see, FIG. 7) and the vehicle position of the vehicle C1 (user's vehicle) at the time of receiving the running data DT.

When the running data DT is relayed to another vehicle (YES in Step S220), in Step S230, the running time estimation system 100 transmits the running data DT read from the relay-waiting running data saving unit 142 to another vehicle.

On the other hand, when the running data DT is not relayed to another vehicle (NO in Step S220), the running time estimation system 100 repeats the process from Step S210.

(4) Running Time Estimation

Figure 6:
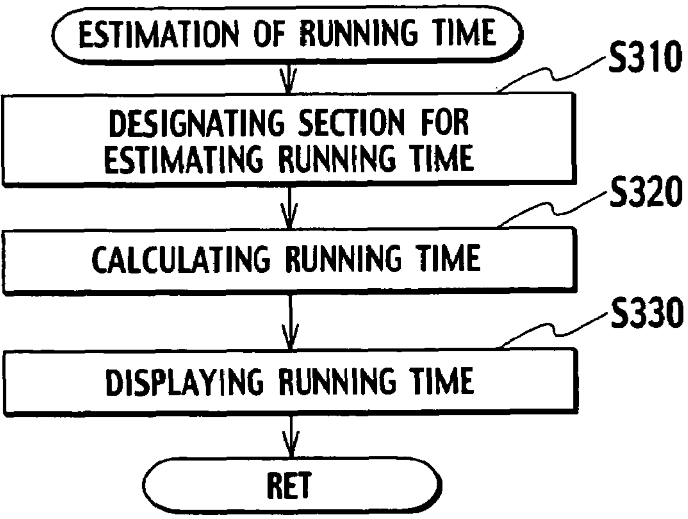
FIG. 6 is a flowchart showing an operation flow of the running time estimation system according to one embodiment of the present invention.

FIG. 6 is a flowchart of estimation process of the running time by the vehicle C1. As shown in FIG. 6, in Step S310, the user of the running time estimation system 100 (such as the driver of the vehicle C1) designates a section to estimate a running time.

In Step S320, the running time estimation system 100 calculates or estimates a running time based on the starting position and end position of the designated section, and the running time estimation data $DT_E$.

For example, as shown in FIG. 11, when the section between the starting position $P_{S1}$ and the end position $P_{E1}$ (see, FIG. 1) are designated as the section whose running time is to be estimated, the running time estimation system 100 sums the running times (1) to (3) in FIG. 11 so that the running time between the starting position $P_{S1}$ and the end position $P_{E1}$ is estimated.

In addition, as shown in FIG. 14, when the section between the starting position $P_{S2}$ and the end position $P_{E2}$ (see, FIG. 1) are designated as the section whose running time is to be estimated, the running time estimation system 100 sums the running times (1) to (4) in FIG. 14 including the gap section G where the running data DT does not exist so that the running time between the starting position $P_{S2}$ and the end position $P_{E2}$ is estimated.

It should be noted that detailed descriptions of the specific method of calculating and estimating a running time can be given, by referring to the explanation of the running time estimation unit 170, which has been described above.

In Step S330, the running time estimation system 100 displays the calculated and estimated running time on the display unit 192.

(Effects and Advantages)

According to the above described running time estimation system 100 of the present embodiment, the running data DT including a plurality of the time and position data (for example, the time and position data S20) includes the vehicle position of another vehicle at a predetermined time (for example, the longitudinal and latitudinal information stored in the vehicle position information S22) and the predetermined time (for example, the time stored in the time information S21), are transmitted/received among the vehicles C1 to C7.

Therefore, the vehicle that received the running data DT uses the running data so that a running time between specific positions can be precisely estimated. That is, according to the running time estimation system 100, a running time between desired positions can be precisely estimated in the case where the situation of traffic congestion is transmitted/received between vehicles by use of a wireless communication system.

Further, according to the running time estimation system 100, the running data DT can include the running speed history information S40 (and S60). Therefore, the speed history information is used so that a running time between the desired positions can be further precisely estimated.

According to the running time estimation system 100, the running data DT can include the identification number S10 that can uniquely specify a vehicle. Therefore, for example, the identification number S10 is referred so that a running time can be estimated by only using the running data DT of a specific vehicle.

Further, when the running data DT having the same identification number S10 has been already saved, it is possible that even when the running data DT having the same identification number S10 is received again (that is, it means that the running data DT is relayed by other vehicle), the running data DT is not relayed to other vehicle.

In other words, it is possible that the same running data DT is prevented from being multiply relayed between the vehicles and the wireless communication system is effectively utilized.

According to the running time estimation system 100, when the running data DT (new running data) overlapping with the running data DT (existing running data) that has been already associated with the road information with regard to the vehicle position in the road information is newly received, the running data DT that has been already associated with the road information is overwritten with the newly-received new running data.

Therefore, even when a plurality of the running data having the same position in the road information is received, a running time can be estimated by using a plurality of the existing running data DT.

According to the running time estimation system 100, when the position at which estimation of the running time is started or ended does not match the vehicle position included in the running time estimation data $DT_E$, a time corresponding to a position (such as time S shown in FIGS. 12A and 12B) corresponding to the position is determined based on a plurality of the time and position data included in the running time estimation data $DT_E$.

Therefore, even when the position at which the estimation of running time is started or ended does not match the vehicle position included in the running time estimation data $DT_E$, a running time can be precisely estimated.

In addition, according to the running time estimation system 100, when the gap G with which the running data DT is not associated in the running time estimation data $DT_E$ is included between the designated positions at which the estimation of the running time is started and ended, the running data DT placed before and after the data of the gap section G is used so that a running time in the gap section G is estimated.

Therefore, even when the gap section G is included between the designate positions at which the estimation of the running time is started and ended, a running time can be precisely estimated.

According to the running time estimation system 100, whether or not the running data DT is relayed is determined based on a distance between other vehicle (for example, the vehicle C2) and the user's vehicle (for example, the vehicle C1) calculated from the latest vehicle position of the vehicle C2 included in the running data DT received by the receiver 130 and the vehicle position of the vehicle C1 at the time of receiving the running data DT.

Therefore, the running data DT can be relayed to other vehicle in distant position while limiting the number of relay.

Other Embodiments

As described above, the contents of the present invention has been disclosed by using one embodiment of the present invention. However, it should not be appreciated that the descriptions and drawings constituting a part of this disclosure limit to the present invention. It will be apparent for those who are in the art that various alternative embodiments are possible from this disclosure.

For example, in the above described embodiment of the present invention, a running time estimation system 100 has an embodiment including a running status controller 180 and a user interface unit 190. However, the running status controller 180 and the user interface unit 190 are not necessarily included in the running time estimation system 100.

Thus, it is obvious that the present invention includes various embodiments that have not been described herein. Therefore, the technical scope of the present invention is only limited by the features thereof according to the following claims that are appropriate from the above descriptions.

What is claimed is:

1. A running time estimation apparatus installed in a vehicle to estimate a running time between designated positions, comprising:

a running data receiver configured to receive running data including a plurality of time and position data having a predetermined time and a vehicle position of different vehicles at the predetermined time by use of a wireless communication system;

a running time estimation data generator configured to generate running time estimation data in which the running data received by the running data receiver is associated with road information from which a position and length of a road can be determined; and a running time calculator configured to calculate a running time between the designated positions by using the running time estimation data generated by the running time estimation data generator, wherein, if the designated positions include a gap section which is a section of the road having no association with the running data in the running time estimation data, the running time calculator estimates a running time of the gap section by using the running data placed before and after the gap section.

2. The running time estimation apparatus of claim 1, wherein the running data further includes a running speed history indicating changes of a running speed of the different vehicles between a first predetermined time and a second predetermined time which is later than the first predetermined time.

3. The running time estimation apparatus of claim 2, wherein the running time calculator estimates a running time of a gap section which is a section of the road having no association with the running data in the running time estimation data by using the running speed history included in the running data placed before and after the gap section when the gap section is included between the designated positions.

4. The running time estimation apparatus of claim 1, wherein the running data further includes identification information for identifying the different vehicles.

5. The running time estimation apparatus of claim 1, wherein the running time estimation data generator overwrites an existing running data with new running data when, in the road information, the new running data including the vehicle position which is overlapping with the vehicle position of the existing running data that has been already associated with the road information is newly received.

6. The running time estimation apparatus of claim 1, wherein the running time calculator estimates a running time between the designated positions by using a determined time corresponding to the designated position which is determined based on a plurality of the time and position data included in the running time estimation data when the designated position does not match the vehicle position included in the running time estimation data.

7. The running time estimation apparatus of claim 1, further comprising a running data relay unit configured to relay the running data received by the running data receiver to a different vehicle by use of the wireless communication system.

8. The running time estimation apparatus of claim 7, wherein the running data relay unit determines whether or not the running data is relayed based on a latest position of the different vehicle included in the running data received by the running data receiver and a distance between the different vehicle and the vehicle which is calculated from a position of the vehicle at the time of receiving the running data.

9. A running time estimation system including a running data relay apparatus, and a running time estimation apparatus for estimating a running time between designated positions, which are installed in a vehicle, wherein the running data relay apparatus comprises:

a running data generator configured to generate running data including a plurality of time and position data having a predetermined time and a vehicle position of the vehicle at the predetermined time; and a running data transmitter configured to transmit the running data generated by the running data generator by use of a wireless communication system, and the running time estimation apparatus comprises:

a running data receiver configured to receive the running data by use of the wireless communication system;

a running time estimation data generator configured to generate running time estimation data in which the running data received by the running data receiver is associated with road information from which a position and length of a road can be determined; and a running time calculator configured to calculate a running time between the designated positions by using the running time estimation data generated by the running time estimation data generator, wherein, if the designated positions include a gap section which is a section of the road having no association with the running data in the running time estimation data, the running time calculator estimates a running time of the gap section by using the running data placed before and after the gap section.

* * * * *